United States Patent [19]

Parzygnat

[11] 4,353,541

[45] Oct. 12, 1982

[54] SELF ENERGIZING COPIER DOCUMENT PRESSURE ROLL

[75] Inventor: William J. Parzygnat, Rochester, N.Y.

[73] Assignee: Xerox Corporation, Stamford, Conn.

[21] Appl. No.: 190,113

[22] Filed: Sep. 24, 1980

[51] Int. Cl.³ .............................................. B65H 5/02
[52] U.S. Cl. .................................... 271/275; 271/233; 271/DIG. 9; 355/75
[58] Field of Search ............... 271/275, 233, 245, 246, 271/DIG. 9, 4; 198/725, 842, 843; 355/75, 76, 3 SH

[56] References Cited

U.S. PATENT DOCUMENTS

| | | | |
|---|---|---|---|
| 3,532,338 | 10/1970 | Brinson et al. | 271/233 X |
| 4,146,219 | 3/1979 | Phillips | 271/233 |
| 4,146,220 | 3/1979 | Barton | 271/233 |

FOREIGN PATENT DOCUMENTS

| | | | |
|---|---|---|---|
| 2815174 | 10/1978 | Fed. Rep. of Germany | 271/245 |
| 52-40193 | 4/1977 | Japan . | |
| 53-82388 | 6/1978 | Japan . | |
| 2040887 | 9/1980 | United Kingdom | 271/233 |

OTHER PUBLICATIONS

Xerox Disclosure Journal, vol. 4, No. 6, Nov./Dec. 1979, pp. 751-752.

Primary Examiner—Bruce H. Stoner, Jr.

[57] ABSTRACT

A copier document apparatus (10) for feeding original document sheets (21) to and from a registration position at an imaging station (20) of a copier with a reversible direction of motion document feeding belt (14) having one flight (18) of the belt overlying the imaging station for document feeding and a second flight (22) spaced therefrom, and apparatus (32) for applying pressure to an area of the back of the first belt flight (18), which pressure is substantially changed in one direction of motion of the belt relative to the other direction of belt motion, to provide decreased pressure between the belt and the document for registration (23) but increased pressure for positive document ejection, in which this pressure change is self actuating and solely from the reversal movement of the belt by a frictional actuating system (30) which is engaged and moved without slippage by the second (upper) belt flight (22) through a connecting lever system (24) connecting the frictional actuating system (30) with the pressure system (32) so as to automatically pivot the pressure system (32) into or out of engagement with the first belt flight (18) automatically in response to the reversal of direction of the second belt flight (22).

12 Claims, 3 Drawing Figures

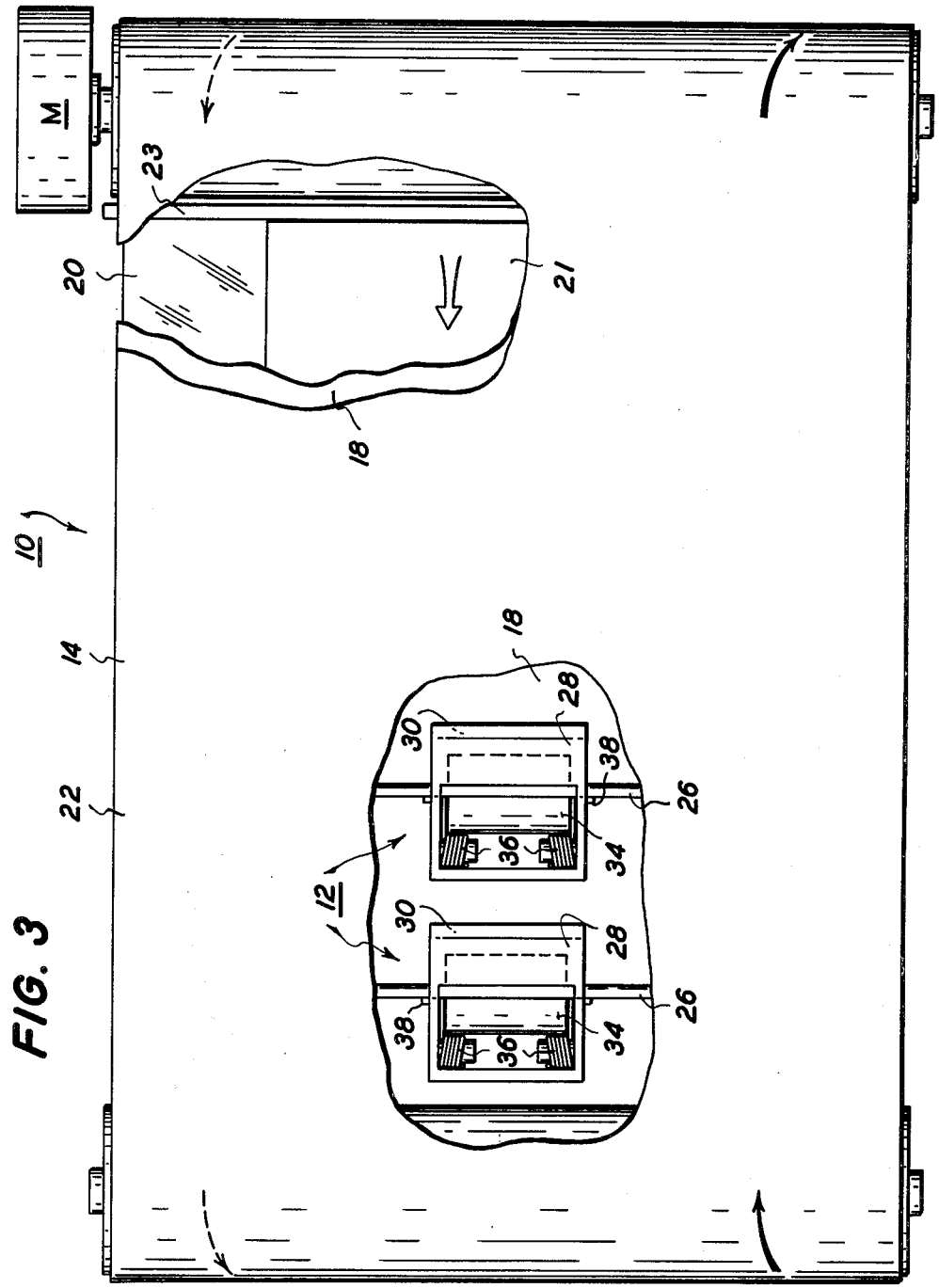

SELF ENERGIZING COPIER DOCUMENT PRESSURE ROLL

This is an improvement in copier document handling apparatus for feeding original document sheets to and from the imaging station of a copier with a document feeding belt system, in which an increased feeding force is provided between the belt system and the document sheet for one direction of belt movement as opposed to the opposite direction of belt movement.

Due to the increase in copying rate or speed of xerographic and other document copiers now in commercial use, and the desirability of providing for the automatic or semi-automatic handling of a wide variety of sizes, weights, thicknesses, materials and conditions of original document sheets, the rapid feeding and registration of such document sheets to and from the proper copying position at the imaging station of the copier is difficult to achieve without damaging or misregistering the documents. The documents must also be rapidly removed after copying for the copying of the next document in order to keep up with the copying rate of the copier. It is also desirable to provide a document handling system which is readily removable to allow conventional manual document placement on the copier imaging station.

Typically, the document sheet is registered by driving one or two edges of the document against gates or stops which may comprise projecting aligned fingers or a fixed or removable vertical registration surface, against which the edge of the sheet is driven into alignment. An important function of such a registration gate or stop is to deskew the moving document, i.e. to properly align it as well as to control its imaging position on the transparent copying window or platen as it is commonly called. Typically, this document feeding to and from the copying registration position is done with a document belt or belts.

Both the frictional characteristics and the normal force with which the document belt presses against the document are quite critical. When the document sheet is being registered by being driven against a registration edge, some slippage must normally be provided between the document feed belt and the document to allow the document to rotate to deskew and to prevent the document edge from being crumpled or damaged by being overdriven against the registration stop. On the other hand, when the document is being fed onto and off of the imaging station, slippage between the belt and the document is generally undesirable. It can cause skewing or misfeeding of the document, particularly during the initial acceleration of the document.

Accordingly, it is known in the art to provide a document handling system in which a pressure roller is pressed against the inside or back of the document belt flight over the copier imaging station to increase the normal force between the document feed belt and the copy sheet at selected areas of the belt. In particular, it is known in the art that this normal force or increased pressure may desirably be greater in one direction of movement of the belt than the other, so as to provide less of such normal force pressure against the belt when the belt is moving the document sheet against a registration edge, and more such pressure when the belt is moving in the opposite direction to feed the document. Of particular interest in that regard is U.S. Pat. No. 4,146,219 issued Mar. 27, 1979 to K. G. Phillips. Note especially FIG. 3 and the variable pressure roller mechanism 400 disclosed therein. Also noted is U.S. Pat. No. 4,146,220 issued Mar. 27, 1979 to P. Barton, particularly roller 301 and FIG. 4 therein.

The actuation of the selectable (variable) normal force pressure roller against the document belt is known to be achievable by the use of an electrical solenoid, although this, of course, entails additional expense both for the solenoid and its power supply and its controls. Examples are disclosed in the "Xerox Disclosure Journal" Vol. 4, No. 6, November/December 1979, pages 751–752; U.K. Patent Application No. 2 040 887A published September 1980 by R. M. Nekula (Xerox); Japanese Application No. 52-40193 filed Apr. 8, 1977 and laid open Nov. 1, 1978 as Laid Open No. 53-125025 by Ricoh, and its German equivalent Application No. 28 15 174 and other equivalents; Japanese Application No. 53-82388 filed June 17, 1978 and laid open Dec. 27, 1979 as Laid Open No. 54-184127 by Copia Co., Ltd. Direct electrical solenoid engagement of a roller with a document is disclosed in U.S. Pat. No. 3,532,338 issued Oct. 6, 1970 to P. R. Brinson, et al.

The following U.S. Patents are cited merely by a way of background for document feeding systems, document belts and normal force roller applications therewith: U.S. Pat. Nos. 3,899,943 issued June 17, 1975 to H. J. Krayer; 3,895,790 issued July 22, 1975 to A. Hoyer, et al; 3,910,570 issued Oct. 7, 1975 to C. D. Bleau; 3,941,376 issued Mar. 2, 1976 to K. E. Liechty, et al; 3,944,209, 3,944,213 and 3,944,214 all issued Mar. 16, 1976 to G. Fallos, et al; and 4,023,791 issued May 17, 1977 to T. Hori, et al.

All of the patents, products and other references cited herein are incorporated by reference for this disclosure, including their teachings of appropriate or alternative uses or applications, or associated apparatus.

One important application of the present invention is in a known document handling system, as for example, the Xerox "5600" copier, or that shown in Xerox U.S. Pat. No. 3,504,908 issued Apr. 7, 1970 to J. R. Krueger and 4,076,233 issued Feb. 28, 1978 to C. Knight et al and other patents noted above in which the document is fed onto one side of the imaging station of the copier by the document belt in one direction of belt motion, which belt motion is reversed for registering the document against the registration edge of the platen and then, after copying, the document is ejected from the platen by another reversal movement of the belt onto the original feeding direction, i.e. the document is fed off of the platen by the document belt in the opposite direction from which the document was moved into registration. As in the "5600" copier, this may include the use of a fixed registration edge rather than a retractable registration edge or gate, and the feeding in of the document from that same side of the platen over that registration edge, then the reversal of the document belt briefly to back the rear or trail edge of the document up against that registration edge, and then driving the document off of the platen from the side thereof opposite from the registration edge. This document feeding system is particularly useful where it is desirable to provide "stream feeding" and/or document recirculation. Since each document sheet enters from one side of the platen and departs from the other side of the platen, the subsequent document can be fed onto the platen simultaneously with the feeding off of the previously copied document. With this system it is particularly important that the copied document be positively ejected without slippage or skewing so that it will not remain on the platen and interfere with the incoming next document sheet, and so that the ejected document may be fed into a stack unskewed for subsequent recirculation back to the platen. This necessitates a positive, substantially nonslip, engagement of the document belt with the document sheet for feeding. However, as discussed above, slippage must be provided for the brief reverse deskewing and registration movement, of the document belt. The present invention is particularly applicable to this system (although not limited thereto) because it provides automatic, rapid, and positive application of additional pressure between the belt and the document to prevent or decrease slippage or skewing during the document feeding, particularly the document ejection, but automatically removes this increased pressure to allow document slippage relative to the belt during the reverse, registration, movement of the belt and then automatically reapplies the pressure as soon as the belt reverses direction to feed the copy sheet off of the platen with a greatly increased normal force to prevent slippage.

It may be seen that the apparatus disclosed herein is of particular application to any document handling system in which the direction of the document belt in ejecting the document from the platen is opposite to the belt direction for driving the document with slippage against the registration edge, because the present invention automatically provides for a substantial difference in the force between the document belt and the document in direct mechanical response to the direction of motion of the belt, without requiring electrical solenoids or other complex mechanisms. The system disclosed herein can provide a precise and constant normal force against the belt at a fixed and constant position whenever the belt is moving in one selected direction, but can immediately and positively remove that normal force pressure against the belt as soon as, and as long as, the belt is driven in the opposite direction.

It is a specific feature of the present invention, as disclosed in the examples hereinbelow, to provide an improvement in copier handling apparatus for feeding original document sheets to and from a registration position at an imaging station of a copier with a reversible direction of motion document feeding belt means having one flight of said belt means closely overlying the imaging station for document feeding and a second flight of said same belt means spaced from said first belt flight, and pressure means for applying pressure to an area of the back of said first belt flight, which pressure is changed for one direction of motion of said belt means, with an improvement which may be characterized by actuating means positioned to frictionally engage and be moved by said second belt flight in only one direction of motion of said belt, and lever means connecting said actuating means to said pressure means so as to automatically pivot said pressure means into said first belt flight solely by said movement of said actuating means by said second belt flight in said one direction, so that said pressure means is self energized automatically in response to the reversal of direction of said second flight of said document belt means to apply substantial pressure to said first flight of said belt means only in to said one direction of motion of said belt means.

The invention will be better understood by reference to the following description of a specific example thereof including the following drawing figures (approximately to scale) wherein:

FIG. 3 is a top view of the document handling apparatus of FIG. 1, illustrating an example of the positions of two said belt pressure applying apparatus therein relative to an example of a copier imaging station and document belt.

Figure 1:
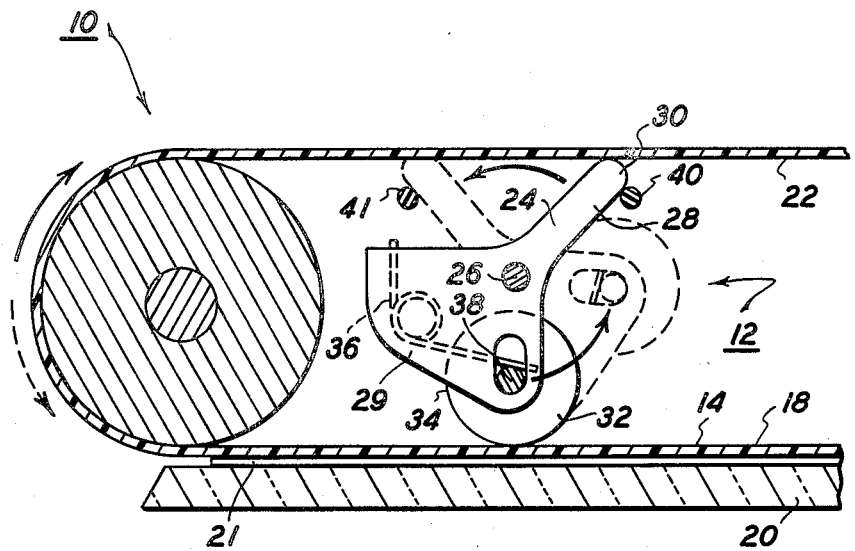
FIG. 1 is a partial cross-sectional side view of an exemplary document handling apparatus incorporating an example of the present invention.

The dashed lines position in FIG. 1 illustrates the alternate (nonpressure) position of the pressure applying apparatus.

Figure 2:
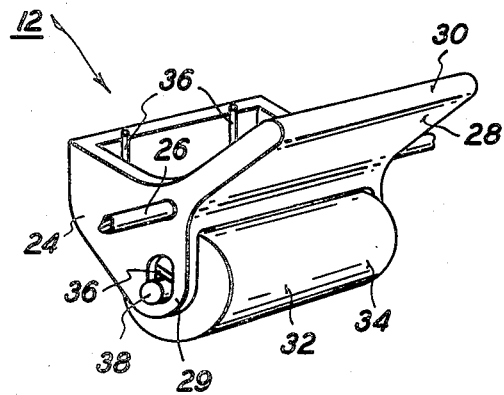
FIG. 2 is a perspective view of the self-actuating belt pressure applying apparatus disclosed in FIG. 1, per se.

FIGS. 1–3 illustrate relevant portions of an exemplary document handling apparatus 10 with a self energizing belt pressure applying apparatus or unit 12 for applying a normal force pressure automatically to a document belt 14 when that belt 14 is moving in one direction, and for automatically removing that pressure when the belt 14 is moving in the opposite direction. As shown in FIG. 1, this pressure preferably is applied by a pressure roller which is pivoted forceably into engagement with the back of the belt 14 over the first belt flight 18 which overlies the copier platen (imaging station) 20, thus substantially increasing the force with which the first belt flight 18 engages a document sheet 21 which is between the first belt flight 18 and the platen 20. This provides for positive ejection of the document sheet 21 from the platen by the movement of the belt 14 in one direction.

With the present invention, the pressure applying apparatus 12 is operated in a very simple but effective and positive manner by the utilization of the force of movement of the opposite or return belt flight 22 which is conventionally substantially spaced over the first belt flight 18. In fact the entire pressure applying unit 12 may be mounted in a small portion of this inter-belt space, over whichever specific area of the belt first flight 18 it is desired to selectively apply pressure for positive feeding or skew prevention. One example of this simple, integral, low cost device is illustrated in the prospective view of FIG. 2, and two of them are illustrated in the top view in FIG. 3. FIG. 3 illustrates exemplary positions of two units 12 relative to the belt 14 and the platen 20 for use in a positive document ejection system, as previously described, in which the document belt 14 is reversibly driven by a suitable reversible drive motor M. Another document handling system example may be seen in the above-cited U.S. Pat. No. 3,504,908 issued Apr. 7, 1970 to J. R. Krueger. However, the following discussion will particularly refer to the enlarged side view of FIG. 1 of said pressure applying apparatus 12.

It may be seen that this pressure applying unit 12 comprises a unitary, monolithic lever means 24 to which all of the other components are mounted. The lever 24 is mounted to a fixed pivot on the document handling apparatus 10 providing an axis of rotation 26 about which the lever means 24, and therefor all other components of the apparatus 12, rotate. This axis of rotation 26 is provided intermediately of the first and second belt flights 18 and 22 in the position illustrated in FIG. 1. The lever means 24 may be considered as having two lever arms 28 and 29 extending in generally opposite directions from the common axis of rotation 26, but at an angle relative to one another. The first lever arm 28 extends generally upwardly from the axis of rotation 26 towards contact with the interior surface of the second belt flight 22. The second lever arm 29 extends generally downwardly toward the interior surface of the first belt flight 18.

The outer (cantilevered) end of the first lever arm 28 provides the actuating means 30 for the selective actuation (pivoting) of the entire apparatus 12. This actuating means 30 here simply comprises the frictional end surface of this first lever arm 28. Although a high friction material surface coating can be provided or inserted on the first lever arm 28 for this purpose, it is not necessary with the automatic force multiplying system provided herein, as will be further discussed below. The entire lever means 24 may be a metal or plastic molding or casting and the actuating means 30 can simply be a curved, relatively smooth, outer end of the first lever arm 28. Additional friction can, of course, be provided by rough grinding, machining, or otherwise treating that surface. However, sharp edges or corners which could abrade the belt 14 should, of course, be avoided. It may be seen that this actuating surface 30, because it is operating at the end of a lever arm 28 of substantial length, provides substantial leverage force for the movement of the entire lever means 24, including the second lever arm 29 integral therewith, about the same axis of rotation 26.

The second lever arm 29 has integrally mounted thereto, a pressure means 32, which is also spaced from the axis of rotation 26, but in a position to be pivoted into engagement with the rear surface of the first belt flight 18. Here the pressure means 32 preferably comprises a metal or plastic pressure roller 34. A spring 36 provides the pressure roller axis 38 with spring loading and allows the roller axis 38 to be movable to provide pressure loaded conformity to the first belt flight 18 surface but allow movement of the pressure roller 34 slightly towards the axis of rotation 26 so as to avoid any tendency of the pressure roller 34 to substantially deform or apply excessive pressure to the first belt flight 18. The torsion spring 36 also accommodates different thicknesses of documents 21 being fed between the first belt flight 18 and the copier platen 20. The second lever arm 29 itself is shaped to allow rotation about axis 26 without contacting either belt flight.

It may be seen, particularly from the dashed line alternative position illustrated in FIG. 1, and the illustrated arrows of rotation, that rotation of the lever means 24 about axis 26 rotates the pressure roller 34 from completely out of engagement or out of contact with the first belt flight 18 into the full or maximum pressure contact with the first belt flight 18 illustrated in the solid line position in FIG. 1. It will be noted that in this latter position the roller axis 38 is located substantially vertically under the mounting axis of rotation 26 of the unit 12, but slightly beyond the vertical, i.e. over-center. Thus the pressure applied by the pressure roller has only a slight reaction moment arm on the unit 12, in a clockwise direction, tending to hold it stable in that position.

Note, that other than the slight vertical freedom of movement provided to the pressure roller 34 against its spring loading 36, that the movement of the pressure roller 34 is otherwise confined once it is in its operating position. That is, the pressure roller 34 cannot be moved in the direction of belt movement, by belt movement against it, regardless of the direction of belt movement, and the pressure roller 34 always applies its pressure to the belt 12 at the same location, controlled by fixed axis 26. This is important for positive document sheet feeding control, particularly where more than one pressure applying unit 12 is being utilized for skew control or document ejection from the platen without skew. The amount of applied pressure is controllable by the setting of spring loading 36 and constant for any given document thickness. This pressure is not dependent on or related to frictional engagement between the movement of the first belt flight 18 and the pressure roller 34, and there is not a large "drag" on the belt from the pressure roller 34 because it is freely rotatably mounted.

In FIG. 3 it may be seen that the document belt 14 is a known single, uniform, endless belt overlying the entire platen 20 to provide a uniform light reflective background against which the documents may be copied. The two said pressure applying means 12 are spaced apart over two spaced minor areas along the circumferential length of the belt, i.e. on a common axis which is in the direction of motion of the belt, and centrally thereof, so that they may be mutually actuated to insure positive document ejection of different sizes of documents and without skewing when in pressure engagement with said belt, but to allow document rotation relative to the belt and registration edge 23 by reducing this pressure.

Referring now to the positive and reliable system by which the entire pressure applying unit 12 is pivoted to pivot the pressure roller 34 in and out of pressure engagement with the first belt flight 14, it is important to remember, as described above, that it is important to be able to apply this increased pressure only during the document ejection, or during both document ejection and in-feeding, but to insure that this increased pressure is positively and automatically removed, or substantially reduced, during the reverse motion of the belt 14 in which the document sheet is being registered against the fixed registration edge and deskewed. During this latter reverse (registration) belt motion, as described above, it is important that the pressure between the belt 14 and the document sheet 21 be low enough to allow some, controlled, slippage therebetween so that the document sheet can deskew and not be damaged as it is driven against the registration edge in that reverse motion of the belt. The system disclosed herein automatically provides this, without requiring any solenoids, sensors, controls or any other associated mechanism. The pressure applying apparatus 12 automatically and positively responds to, and is solely driven by, the reversal of motion of the document belt 14, and in particular by the movement of the upper (second) belt flight 22. It will be noted this is the return belt flight and it is always moving in the opposite direction from the lower (first) belt flight 18. This is advantageously utilized. Also utilized is the important distinction that the upper belt flight 18, because it is not overlying the platen, can be readily deformable. Thus the upper belt flight 18 can be provided with an area of deformable engagement with the actuating means 30 of the pressure applying unit 12. I.e. that area of the belt flight 22 can flex to accommodate a pivotal movement of the actuating means 30, thereinto which the lower belt flight 18 cannot. This enables a simple, positive drive, nonslip, force multiplying system, as will now be further described. (For further theoretical details on the vector force theory of the frictional drive force multiplying system herein see, for example, a text such as "Machine Design", published 1956 by McGraw-Hill Book Company, Inc., pages 405 and 406.)

The present system provides a positive "over-center" system without "digging into" the belt because the belt resiliently forms to allow the rotation of the frictional actuating surface 30 on the first lever arm 28 through an arc of intersection and deformation with the second belt flight 22, in which movement the actuating surface 30 is driven with a high normal force in nonslip engagement with, and movement with, the interior surface of said second belt flight 22. The pressure applying apparatus 12 is so designed that this occurs *only* in *one* direction of motion of the belt. In the opposite direction of motion of the belt the frictional actuating surface 30 freely slips on, and is effectively constantly pushed away from, the second belt flight 22 rather than driven into it, once the unit 12 has been rotated out of pressure engagement from both belt flights. (The dash line position in FIG. 1.)

The pressure applying apparatus 12 has two stable positions, one for each direction of the belt motion, one in which pressure is applied and the other in which it is not, plus an intermediate rotating movement in which it is being positively driven during belt motion reversal with the nonslip, over-center or toggling action provided herein. In said initial or stable positions, the first lever arm 28 extends at an angle from the vertical at an acute angle to the second belt flight 22 from the vertical line through the axis of rotation 26. I.e. in the two stable positions the first lever arm 28 is angled or pointing "downstream" of the direction of motion of the second flight 22. The engagement of the second belt flight with the actuating surface 30 provides a moment arm rotating the first lever arm 28, and therefore the entire unit 12, in the same direction as that belt movement. Therefore when pointing downstream, this is tending to rotate the actuating surface 30 away from the second belt flight 22 to minimize or decrease the normal force therebetween and allow free slippage therebetween. This is the solid line position illustrated in FIG. 1 for the direction of motion of the belt illustrated by the arrows thereon. However, when there is a reversal of the belt direction of motion, so that the belt 14 is moving in the opposite direction illustrated by the dashed line arrows thereon in FIG. 1, the lever arm 28 is now pointing upstream, and these force factor relationships are reversed.

As shown in FIG. 1, the maximum degree or extent of rotation of the unit 12 may be restricted by stops 40 and 41, as shown, preferably resilient, to insure that the actuating surface 30 on the first lever arm 28 does not completely disengage from contact with the second belt flight 22 and to limit the maximum extent of the rotation, and the two extremes of position, of the lever means 24. As exemplified in FIG. 1, the stop 40 and the first lever arm 28 are so positioned and angled relative to the axis of the pressure roller 34 about axis 26 and the spacing between the first and second belt flights so that the first lever arm 28 will have swung the frictional surface 30 thereof into a minimum belt deformation belt slippage position when the pressure roll has reached its pressure applying position as described above. Note that this is provided by the obtuse angle formed by the respective lines from the point of contact of actuating surface 30 with the secnd belt flight 22 to the pivot axis 26 relative to the intersecting line from that pivot axis 26 to the axis 38 of the pressure roller. To express it another way, this is provided here by the first and second lever arms 28 and 29 and extending in substantially opposite but relatively oblique angular directions from the common axis of rotation 26, and whereas in the pressure applying position the second lever arm 29 is generally vertical the first lever arm is at a substantial acute angle from the vertical.

Immediately upon the reversal of the belt motion, the friction between the belt and the now upstream pointing first lever arm 28 initiates the rotation of the first lever arm 28 in the direction of belt motion. This rotation of the first lever arm 28 about the now downstream axis of rotation 26 pivots the frictional surface 30 deformably up into the upper belt flight 22 with increasing force, deforming that belt flight and insuring positive nonslip continued rotation of the first lever arm 28 through an over-center arc from the first stop 40 to the second stop 41, i.e. until the lever arm 28 is again pointing downstream for this new direction of belt motion and is again slipping relative to the second belt flight 22 in that second direction of belt motion. This positive, rapid, nonslip drive of the first lever arm 28 by the reverse movement of the second flight 22 positively rotates the axis 38 of the pressure roller 34 by the same angle, thereby positively rotating it out of engagement with the belt first flight 18 to remove the pressure therefrom, i.e. into the dashed line position of FIG. 1. As discussed above, this alternative second position of the first lever arm 28 against the second stop 41 is equally stable as long as the belt continues to move in that same dashed-line arrow direction. As soon as the belt again reverses direction, i.e. returns to the original direction of motion illustrated by the solid movement arrow in FIG. 1, the frictional surface 30 will again be temporarily "grabbed" by the second belt flight 22 surface to again positively rotate the entire pressure applying apparatus 12 back to its initial position.

As further described in said "Machine Design" publication, this positive driving of the first lever arm 28 is aided by appropriate selection of the force vectors, or ratio of moment arms, of the first lever arm 28 relative to the axis of rotation 26. In particular, the line of effective extension of the first lever arm between the axis of rotation 26 and the initial point of contact of the surface 30 with the belt is a vector force line. Its horizontal vector component in the direction of motion of the second belt flight 18, when divided by its orthogonal vector component in the vertical axis (between the axis of rotation 26 and the second belt flight) should be less than the coefficient of friction between the surface 30 and the second belt flight. This insures that the surface 30 of the first lever arm 28 will jam or stub against the belt if the belt reverses, to provide a positive drive without slippage therebetween in one direction of belt movement, by greatly increasing the force between that surface 30 and the second belt flight in that one direction of movement only.

An alternative actuating means 30 may be provided by a different cam profile at the end of lever arm 28. That is, the first lever arm 28 would have this different end configuration and instead of a small curved radius would have a much larger cam surface providing a more positive frictional engagement with the belt. This cam surface would have a curvilinear surface on the first lever arm with a radius about said same axis of rotation 26 which could vary to provide an increasing radius between the axis of rotation 26 and the second belt flight 22 as the lever means 24 is rotated in one direction. This variable cam radius would allow additional design flexibility in the amount of deformation or deflection of the upper belt flight 22 by the actuating means 30, since this deformation would not be dependent only on the angle from the vertical of the first lever arm 28 but also upon the variable length of the lever arm 28 at respective positions along the variable cam profile. For example, this could be utilized to provide more deformation and a higher frictional slippage force between the cam surface and the second belt, including, if desired, more deformation in one stop position in one direction of belt motion than the other. This could provide a more positive holding of the unit 12 in the pressure applying stop 40 position, i.e. in the belt infeeding and ejecting drive direction. This of course, may cause more belt wear, but the total force can be with lower pressure, distributed over the larger area on the cam surface to minimize wear.

As an alternative embodiment, it will be appreciated that either the frictional surface 30 or the alternative cam surface described above, or other variants thereof, may be provided by separate special material components, or inserts and these may be spring loaded, similar to the spring loading 36 provided for the pressure roller 34 or otherwise, to allow the effective length of the first lever arm 28 to vary with increasing force between the second belt flight 22 and the actuating means 30. This can be utilized to control and reduce the amount of deformation on the second belt flight during the rotation of the unit 12. A belt backing plate could then be used to limit or prevent belt deflection in the contact area.

It will be appreciated that further alternatives, refinements, improvements, variations or modifications may be provided in the disclosed embodiments which will be obvious to those skilled in the art, and they are intended to be encompassed by the following claims.

I claim:

1. In a copier document handling apparatus for feeding original document sheets to and from a registration position at an imaging station of a copier with a reversible direction of motion document feeding belt means having one flight of said belt means closely overlying the imaging station for document feeding and a second flight of said same belt means spaced from said first belt flight, and pressure means for applying pressure to an area of the back of said first belt flight, which pressure is changed for one direction of motion of said belt means, the improvement comprising:

actuating means positioned to frictionally engage and be moved by said second belt flight, and lever means connecting said actuating means to said pressure means so as to automatically pivot said pressure means into said first belt flight solely by said movement of said actuating means by motion of said second belt flight in one direction so that said pressure means is self energized automatically in response to the reversal of direction of said second belt flight to apply substantial pressure to said first belt flight only in said one direction of motion of said second belt flight.

2. A copier document handling apparatus according to claim 1, in which said lever means is rotatably mounted at an axis of rotation intermediately of said first and second belt flights, said lever means having a first lever arm on which said actuating means is spaced from said axis of rotation and a second lever arm on which said pressure means is spaced from said axis of rotation, said first and second lever arms extending in substantially opposite but relatively angular directions from said axis of rotation, with said first lever arm extending toward said second belt flight and said second lever arm extending toward said first belt flight, and said first and second lever arms being connected for rotation of said second lever arm about said axis of rotation by said first lever arm.

3. A copier document handling apparatus according to claim 2, in which said pressure means comprises at least one roller rotatably mounted on said second lever arm of said lever means and pivotable with said second lever means into and out of pressure engagement with said first flight of said belt means.

4. A copier document handling apparatus according to claims 1 or 2 in which said actuating means is a curved frictional surface on said lever means spaced from said pressure means.

5. A copier document handling apparatus according to claim 2 in which said actuating means is a curved surface at the end of said first lever arm.

6. A copier document handling apparatus according to claims 1, 2 or 3 in which said lever means comprises means for pivoting said actuating means deformably towards and into said second belt flight with increased pressure in said one direction of motion to inhibit slippage therebetween, and for pivoting said actuating means away from said second belt flight for decreasing the frictional engagement and providing slippage therebetween in the reverse direction of motion of said second belt flight.

7. A copier document handling apparatus according to claims 2 or 5 in which said first lever arm in one position extends at an angle from said axis of rotation of said lever means towards said second belt flight and towards said one direction of motion thereof to provide a force increasing system between said actuating means and said second belt flight only in said one direction of belt motion.

8. A copier document handling apparatus according to claim 7 in which the line of extension of said first lever arm between said axis of rotation and an initial point of contact between said actuating means and said second belt flight has a vector length in the direction of motion of said second belt flight divided by the vector length in the direction between said second belt flight and said axis of rotation which is less than the coefficient of friction between said actuating means and said second belt flight so that the force between said actuating means and said second belt flight is greatly increased by rotation of said first lever arm by said movement of said second belt flight in said one direction.

9. A copier document handling apparatus according to claim 1 in which said lever means is a single integral member with first and second lever arms extending in generally opposite directions from a fixed axis of rotation and wherein said second lever arm is rotated about said fixed axis from a position at a substantial angle to the vertical into and slightly past a substantially vertically aligned position by said movement of said second belt flight in said one direction, in which position said pressure means is pivoted into said first belt flight by said second lever arm.

10. A copier document handling apparatus according to claims 1, 2, 3 or 5 in which said belt means is a single uniform endless belt and in which two said pressure means are spaced apart relative to said first belt flight over said imaging station, and adapted for substantially simultaneous activation by said movement of said second belt flight in said one direction of motion, to prevent document skewing when in pressure engagement with said first belt flight.

11. A copier document handling apparatus according to claims 1 or 2 in which the motion of said second belt flight in the direction of motion opposite from said one direction of motion automatically reverse pivots said pressure means out of substantial pressure engagement with said first belt flight with said lever means.

12. A copier document handling apparatus according to claims 2, 3 or 5, in which said lever means is a single integral member with said first and second lever arms extending in generally opposite directions from said axis of rotation, said axis of rotation being a fixed axis, and wherein said second lever arm is rotated about said fixed axis from a position at a substantial angle to the vertical into and slightly past a substantially vertically aligned position by said movement of said second belt flight in said one direction, in which position said pressure means is pivoted into said first belt flight by said second lever arm.

\* \* \* \* \*